Figure 1:
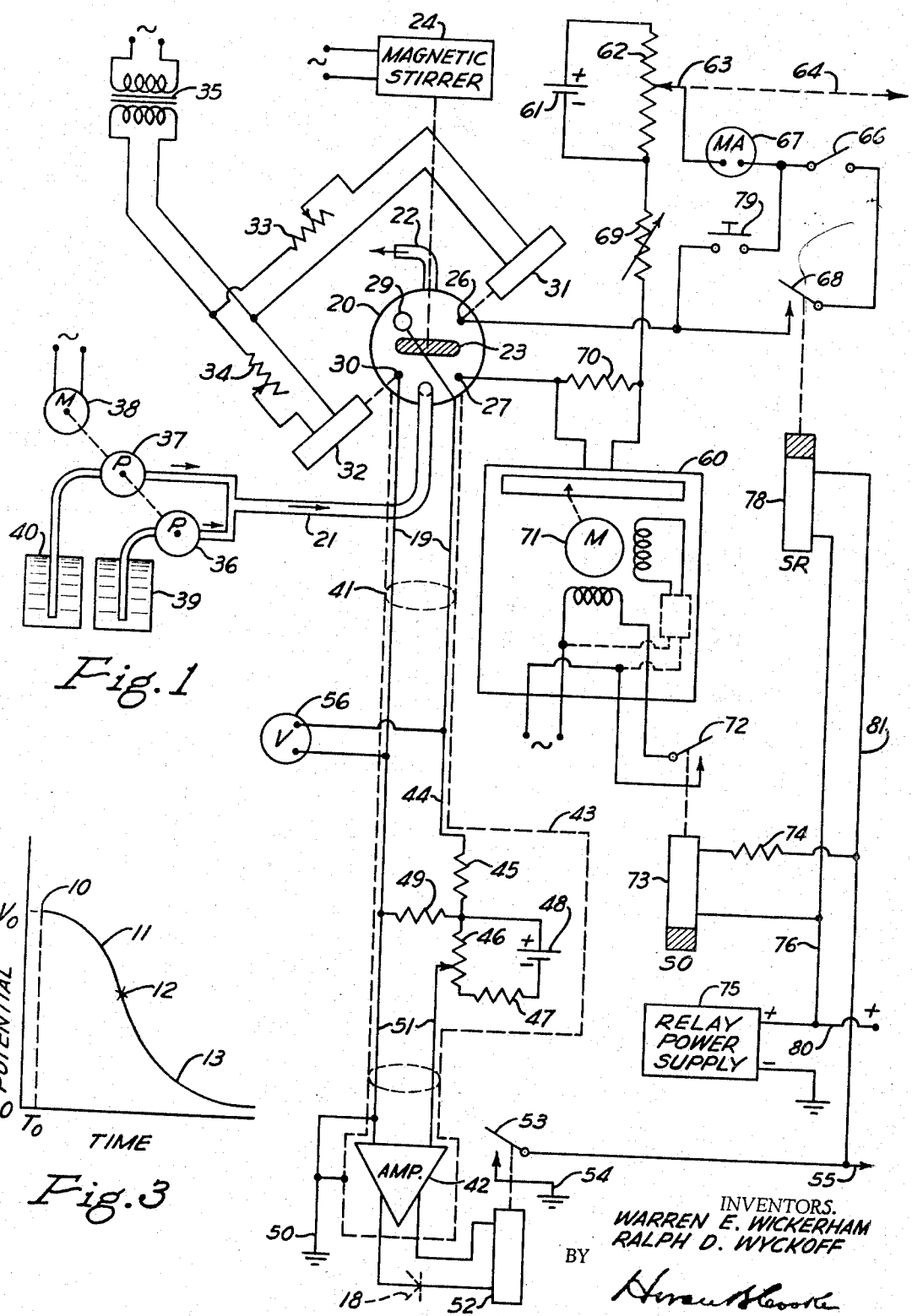

INVENTORS.
WARREN E. WICKERHAM
RALPH D. WYCKOFF
BY
ATTORNEY.

United States Patent Office 3,341,430
Patented Sept. 12, 1967

3,341,430
COULOMETRIC TITRATION EMPLOYING
ON-OFF CYCLING
Warren E. Wickerham, Penn Hills Township, Allegheny County, and Ralph D. Wyckoff, Oakmont, Pa., assignors to Gulf Research & Development Company, Pittsburgh, Pa., a corporation of Delaware
Filed June 28, 1963, Ser. No. 291,378
13 Claims. (Cl. 204—1)

This invention relates to an apparatus for continuous coulometric titration and in particular pertains to a continuously recording coulometric titrator and a novel servosystem therefor.

In the so-called coulometric titration of an electrolytic solution an electric current is passed through the solution between an appropriate indicating and reference electrode system is arranged to generate in the solution an ion that titrates against an ion originally present in the solution and whose concentration it is desired to determine. By measuring the quantity of electricity (i.e. the time integral of the current) required to generate sufficient titrating ions to reach an end point one can determine the amount of titrated ions present in the original solution. The end point can usually be detected by a rather abrupt change in the electrolytic potential of the solution as measured between an appropriate indicating and reference electrode system in the solution. This type of measurement is readily accomplished in a fixed sample of the solution to be titrated.

In attempting to make a continuous coulometric titration of a flowing electrolytic solution numerous difficulties arise. While it appears theoretically feasible to employ a titrating current in an electrolytic cell that continuously generates exactly enough new titrating ions to instantaneously react with new ions to be titrated that are brought in to the cell with the continuously flowing solution, it is found that practical difficulties make such a balance unattainable. The primary difficulty stems from the time element in the reaction rate between titrating and titrated ions. A further difficulty arises because the potential employed to continuously detect the end point is a logarithmic function of the concentration of the titrated and titrating ions, so that normal perturbations in the balance condition may under certain conditions set up violent oscillations in the system that oftentimes result in instability.

These difficulties are avoided in the present invention wherein a substantially continuous coulometric titration of an electrolytic solution is made, and the result recorded and/or used for control purposes. Furthermore the servosystem employed to adjust the titrating current is applicable to any control system in which the sensor detects changes resulting from the integrated effect of the variable actually under control. Accordingly the continuous coulometric titration apparatus herein disclosed may be considered a specific example of a controlled system employing the servosystem which forms the broader aspect of this invention.

It is an object of this invention to provide a servocontrol system for a process in which the sensor detects changes resulting from the time integral effect of the process variable under control.

It is another object of this invention to provide a substantially continuously operating self-balancing recording system in which the balance-detecting sensor is responsive to the time integral effect of the recorded parameter.

It is a further object of this invention to provide apparatus for substantially continuous coulometric titration of ions in a conducting liquid.

It is a still further object of this invention to provide apparatus for substantially continuous determination of the mercaptan ion in a hydrocarbon product stream.

This invention is described in the following specification of which the drawings form a part, and in which FIGURES 1 and 2 taken together show a schematic electrical wiring diagram of one embodiment of the apparatus of this invention when employed for continuous coulometric titration; and FIGURE 3 is a graph of the sensor potential versus time that is typical of the coulometric titration forming the example of this invention.

In its broader aspects this invention provides a self-adjusting process control method and apparatus in which the process variable that is detected by the sensor is dependent on the time integral of the controlled process parameter. More specifically the invention provides an automatic coulometric titrator for a continuously flowing stream in which the controlled process parameter is the titrating current and the process variable detected by the sensor is the titration potential, the latter being dependent on the quantity (coulombs) of electricity passed. In this invention the controlled parameter is successively turned on and off as dictated by the sensor and the parameter is automatically adjusted so that the on and off periods are of equal time duration. In the example herein described the titrating current is turned on and off in response to signal from the sensor. After the current is turned on, the sensor, which in the example herein described is the voltage measured between an appropriate electrode system in a conducting solution, eventually detects an end point and shuts off the current. Eventually the sensor again calls for current and the cycle repeats. The periods during which the current is respectively on and off are measured with a timing device that also activates a servomotor which adjusts the value of current so that the off and on periods are of equal time duration, under which condition the current when on is exactly twice the theoretical end point current if it were continuously turned on and never turned off. The current is recorded during the on period and/or this current may be employed for control purposes. The invention is particularly described in connection with the continuous coulometric titration of mercaptan sulfur in a sample stream such for instance as may be obtained from a chemical process, e.g. a refinery stream.

This invention will be described by reference to the recording of mercaptan concentration in a refinery stream, but it is to be understood that this is by way of example and the invention may be applied to other processes as will become evident to those skilled in the art.

It is quite common for hydrocarbon or certain other types of refined or partially refined organic liquids to contain appreciable amounts of mercaptan sulfur, which sulfur mercaptans are generally undesirable and must be removed by chemical treatment. It is necessary to know the concentartion of the mercaptans beforehand and/or to control the treating process for their removal. One known way of determining the mercaptan concentration is by titrating the sample with silver ions and this is most conveniently done by electrolytic titration. For this purpose a measured amount of sample is mixed with an appropriate polar solvent or electrolyte. For inorganic compounds it is customary to use ammoniacal sodium hydroxide solution as the electrolyte, while for organic compounds it is customary to use an alcohol containing either ammonium nitrate or sodium acetate with a small amount of water. In any case a measured amount of sample is mixed with a measured amount of electrolyte of known concentration to form an electrolytically conducting homogeneous mixture, i.e. a solution, in which the mercaptans exist in ion form.

For purposes of explanation let it first be assumed that a closed electrolytic cell is employed containing a fixed measured amount of sample and electrolyte. It is known that the mercaptan ions may be titrated with silver ions which may be generated by passing an electric current through the solution between two electrodes, the positive electrode being silver and the negative electrode being an inactive metal such as platinum. In order to detect when there have been sufficient silver ions generated in the solution to neutralize the mercaptan ions in the solution, it is customary to observe the potential of the solution against a silver-calomel electrode system. The solution cell thus contains four electrodes, a silver anode and a platinum cathode between which the titrating current is passed, and a silver electrode and a standard calomel electrode between which an E.M.F. is measured with a high resistance voltmeter such as a vacuum-tube voltmeter.

It is found that as titrating current is passed through a cell as described above, the curve of observed E.M.F. versus time has the general form illustrated in FIGURE 3. When the titrating current is turned on at a time say $T_0$ a certain potential $V_0$ is observed as indicated by the curve at 10. As silver ions are generated, the observed potential remains substantially constant until nearly all the mercaptan ions have been neutralized by current-generated silver ions. As the end point is approached, the potential begins to fall as indicated at 11. When all of the mercaptan ions have been neutralized and some excess of silver ions are present, the curve will again flatten out as at 13. The exact end point is considered to occur at the inflection point 12 of the curve of FIGURE 3, and the quantity of electricity, i.e. current times time, that is required to reach the end point from the initial time $T_0$ is a measure of the mercaptan content of the sample. The manner in which the actual mercaptan concentration in the sample is calculated from the measured quantity of electricity is well known to those skilled in the art.

If we now consider a similar cell through which a known mixture of sample and electrolyte are continuously flowing at a known constant rate, and a silver-ion-generating titrating current is employed that generates silver ions faster than a chemically equivalent amount of mercaptan ions brought in by new solution, then the potential curve will be somewhat similar to that of FIGURE 3. As the current-generated silver ions catch up to their mercaptan equivalence, the measured potential will begin to drop as at 11, will pass through an inflection point as at 12, and continue downward to 13 when more silver ions are generated per unit of time than are equilibrated by mercaptan ions brought into the cell by new solution. Obviously if the current could be maintained to always hold the potential at the voltage-inflection point 12, the current would then be a measure of the mercaptan concentration in the flowing sample. However, as previously pointed out, the current is not easily held at this equivalence-point value. It is found that such a simple system will hunt excessively and often becomes completely unstable. The time constant is usually long, and while it may be reduced somewhat by reducing the volume of the cell, there always remains an inherent chemical reaction time that cannot be circumvented. This invention is directed to the problem of providing an automatic coulometric titrator for such an electrolytic system.

Referring now to FIGURE 1 there is indicated a test cell 20 preferably made of glass, having an inlet tube 21 and overflow outlet 22. The cell is provided with a conventional stirring bar 23 comprising a Teflon-enclosed magnet. The entire cell 20 is placed on a conventional magnetic stirrer indicated by 24 comprising a permanent magnet attached to the shaft of a motor that is driven by an A-C power as indicated. The motor of magnetic stirrer 24 rotates the permanent magnet which in turn rotates the stirring bar 23 thus keeping the contents of the cell 20 well mixed. As previously indicated, the cell 20 is provided with four electrodes indicated as 26, 27, 29, and 30. Electrode 26 is made of metallic silver and as will become evident serves as a source of silver ions. Electrode 27 is made of platinum. Titrating current from a D-C circuit to be described is applied to electrodes 26 and 27, electrode 26 being positive and electrode 27 negative, and the flow of this titrating current introduces silver ions formed at the electrode 26 into the solution in cell 20. Electrode 30 is also made of silver metal and serves as one electrode of a potential-measuring circuit whose other electrode 29 comprises a standard calomel (mercury) electrode. Electrodes 29 and 30 are connected by means of wires 19 in a shielded cable 41 to a potential-measuring circuit to be described. The silver electrodes 26 and 30 are each mechanically mounted so that they may be agitated by means of vibrators 31 and 32 respectively. Each of the vibrators 31 and 32 has a rheostat 33 and 34 respectively, by means of which the current supplied to the vibrator may be adjusted in order to obtain reasonable amplitude of motion for the purpose of preventing the accumulation of bubbles or solid deposits on the respective electrodes 26 and 30. Power is supplied to the buzzers 31 and 32 by means of a step-down transformer 35 connected to A-C power as indicated.

In the continuous titration to be described the sample is made to flow into the titration cell at an accurately known rate. For this purpose a precision positive-displacement type metering pump 36 driven by a constant-speed motor 38 transfers sample from sample source 39 into cell 20 via inlet tube 21. In the particular titration herein described by way of example, it is necessary to mix sufficient electrolyte with the sample to be titrated to impart conductivity. It is convenient in this case to employ two metering pumps 36 and 37, the pumps 36 and 37 being mechanically connected together and to the drive motor 38 as indicated. Motor 38 is preferably a synchronous 60 cycle A-C motor connected to A-C power as indicated. Pump 37 pumps the appropriate (previouslly mentioned) electrolyte from a supply 40 into the inlet tube 21 and into cell 20. In the particular example here described of titrating mercaptan sulfur in an organic sample the pump 37 need not be so precise since the electrolyte from supply 40 merely serves to impart conductivity to the sample and does not take part in the titration reaction. Mixing of the fluids from the supplies 39 and 40 takes place in the inlet tube 21 and mixing is further completed in the cell 20 by means of the stirring bar 23. The pump 36 thus delivers sample to cell 20 at a precisely known rate, the sample having a mercaptan content that is to be determined by the titration.

It is apparent that for certain other types of titrations it may be necessary that both pumps 36 and 37 be of a precision type. In still certain other types of titration the second pump 37 and supply 40 may not be required, or pump 37 may simply pump a diluent, or may pump a preliminary reactant, as dictated by the particular titration reaction being employed in manner well known in the analytical chemistry art. In the event that the sample to be titrated is a solid material it may be fed at accurately known rate into a stream of an appropriate ionizing solvent and the solution analyzed by the coulometric titration system of this invention.

The potential leads 19 from electrodes 29 and 30 are connected through a shielded cable 41 to an amplifier 42 by way of a network indicated inside of an electrical shield 43. The positive potential wire 44 is connected through resistor 45 to a bias-adjusting circuit comprising variable resistor 46, fixed resistor 47, and battery 48 connected as indicated. A fixed resistor 49 is connected as indicated so that the resistors 45 and 49 form a voltage-divider having high input impedance and low impedance. All of the elements 44 to 49 are located inside the shield 43 which is connected to the cable shield 41 and to ground as at 50. By means of the circuit comprising elements 46, 47, and 48 and adjustable positive potential is applied to lead 44 by means of the battery 48 to counterbalance the voltage between electrodes 29 and 30 at the end point 12 of FIGURE 3. The adjustable buck-out voltage is provided so that at the selected end point the amplifier input signal may be made zero. A voltmeter 56 having a high input impedance, as for example a vacuum-tube voltmeter, is connected to leads 19 to indicate the potential between electrodes 29 and 30. Potentiometer 46 is adjusted so that the resultant voltage on leads 51 is substantially zero at the desired end point of the titration.

The leads 51 are connected to the input of an amplifier 42 whose output is delivered to relay coil 52. The amplifier 42 is a conventional D-C amplifier of high sensitivity and may, for example, be of the type customarily used to amplify thermocouple E.M.F.'s. Such amplifiers usually include a chopper in the input circuit and a synchronous rectifier in the output circuit but these details are conventional and are therefore not shown in FIGURE 1. The amplifier 42 is of a type whose synchronous rectifier is of the phase-sensitive type such that negative output voltages are not developed, i.e. the output of amplifier 42 is either a positive voltage or zero, this being diagrammatically indicated in FIGURE 1 by the rectifier 18.

The calomel electrode 29 has an inherently high impedance and therefore the circuits connected thereto and to the input to amplifier 42 are designed in well-known manner to avoid undue loading of the potential-measuring circuit connected between electrodes 29 and 30. It is apparent that the voltage divider comprising resistors 45 and 49 may be omitted and the potential from electrodes 29 and 30 connected through a bias circuit similar to elements 46, 47, and 48 directly to the input of amplifier 42 provided that the amplifier has a sufficiently high input impedance so as not to load the potential-measuring circuit including calomel electrode 29. However, it is preferred to use the voltage divider elements 45 and 49 located close to the cell 20 so that the line comprising the shielded cable leads to the bias circuit and amplifier 42 will operate at a relatively low impedance and thereby minimize extraneous electrical pick-up. The voltage attenuation effected by the voltage divider is easily compensated in the amplifier 42 so that no loss of over-all sensitivity results. The contacts of relay 52 comprise normally open contacts 53, having one terminal connected to ground at 54 and the other terminal connected to a lead 55 that continues on FIGURE 2 as will be explained later.

The electrodes 26 and 27 of cell 20 are connected to a direct-current titrating circuit and the current in this circuit is recorded by means of a conventional potentiometric recorder 60. The titrating circuit is energized by means of battery 61 and controlled by potentiometer 62 whose slider 63 is mechanically connected to a drive connection 64. The manner in which the drive 64 is actuated will be explained later in connection with FIGURE 2. Part of the voltage of battery 61 tapped off across potentiometer 62 is applied through milliammeter 67 and manual on-off switch 66 (normally closed) and normally open relay contacts 68 to the electrode 26, the other end of the titrating current circuit being connected through adjustable resistor 69 and a calibrated resistor 70 to the platinum electrode 27. It is apparent that with the resistance of resistor 70 accurately known and the scale constant of the recorder accurately known, the recorder will measure and record current through the titrating circuit of electrodes 26 and 27. In automatic operation the titrating circuit is closed by energization of relay coil 78 which for a reason to be explained is of the slow-release type. For purposes of preliminary adjustment, the titrating circuit may be closed by manually pressing normally open push button 79.

The recorder 60 may be a conventional potentiometric recorder with any convenient known sensitivity, as for example eight millivolts full scale. The recorder pen motor, preferably of a conventional two-phase type schematically indicated by 71, has one winding connected through normally open relay contacts 72 that are closed only when relay coil 73 is energized. The relay contacts 72 are preferably connected in the circuit with the fixed phase of the pen motor 71, since the circuit of its variable phase involves other elements of the recorder including a signal amplifier as implied by the broken lines. The relay coil 73 is of the slow-operate type and has in its circuit a series resistor 74 to further insure slow operation. It is apparent that the pen motor 71 is activated only when the contacts 72 are closed. Relay coils 73 and 78 are connected in parallel between leads 76 and 81, and when relay power is applied to these leads, relay 78 operates first and when the power is cut off, relay 78 releases last. Thus contacts 72 are never closed unless the titrating current is on. This keeps the pen of recorder 60 from retaining to zero each time the titrating current in the circuit of electrodes 26 and 27 is turned off, but the pen records correctly when the current is turned on.

Relay coils 73 and 78, as well as coils of other relays shown on FIGURE 2 to be described later, are energized at appropriate times from a conventional power supply 75 which supplies D-C voltage, as for example 28 volts, to a lead 80 marked + which also carries over to FIGURE 2. The negative terminal of the power supply 75 is connected to ground as indicated in FIGURE 1. Relay coils 73 and 78 are conected by lead 81 to lead 55 previously mentioned which returns to ground 54 through relay contacts 53.

It is apparent from the circuits so far described that when the positive voltage of calomel electrode 29 produces a voltage across resistor 49 that exceeds the bias voltage across resistor 46, the voltage differential is amplified and actuates relay 52 which closes contacts 53 thereby energizing relay coils 73 and 78. The resulting closure of contacts 68 causes titrating current from potentiometer 62 to pass through the current electrodes 26 and 27. Closure of contacts 72 activate pen motor 71 of recorder 60 so that the titrating current flowing through the current electrodes 26 and 27 is recorded. Due to the current flowing between electrodes 26 and 27, silver from the anode 26 enters the solution as silver ions in cell 20 to cause reduction in the voltage developed by calomel electrode 29. After sufficient silver ions have been produced, the potential falls below the end point potential (12 of FIGURE 3) and relay 52 releases thus opening contacts 53. This releases relays 73 and 78 with resulting opening of contacts 72 and 68. The titrating current is thus turned off by the opening of contacts 68. A servo-system provided with a servomotor adjusts the potentiometer slider 63 in a manner (to be described later with reference to FIGURE 2) which tends to equalize the duration of time that the titrating current is on with the duration of time that the titrating current is off.

The cell 20 is so designed and the electrodes 26, 27, 29, and 30 are located in the cell 20 so as to minimize "cross-talk" between the titrating current circuit connected to electrodes 26 and 27 and the potential-measuring circuit connected to electrodes 29 and 30. The presence of such cross-talk may be detected with the titrating current on and motor 38 stopped. Normally open push button 79 is momentarily closed and opened manually and this should have no instantaneous effect on the potential observed on voltmeter 56. The titrating current will, of course, in time affect the potential indicated by meter 56 and this should not be confused with any instantaneous effect due to cross-talk. Any cross-talk observed can be substantially eliminated by changing the location of the respective electrodes slightly in the cell 20. It is apparent that the potenital electrodes must be located on the same equipotential surface of the electric field set up by current flow in the solution between the current electrodes in order that the measured potential be due solely to the electrochemical effects in the sample solution. Care must also be taken to avoid A-C pick-up in the various circuits as well as stray grounds. It has been found desirable to operate all devices requiring A-C house current such as amplifier 42, voltmeter 56, power supply 75, buzzers 31 and 32, recorders 60, all motors, etc. through isolating transformers (not shown) in order to avoid pick-up and accidental grounds that might otherwise occur through the power circuits of these various elements.

Figure 2:
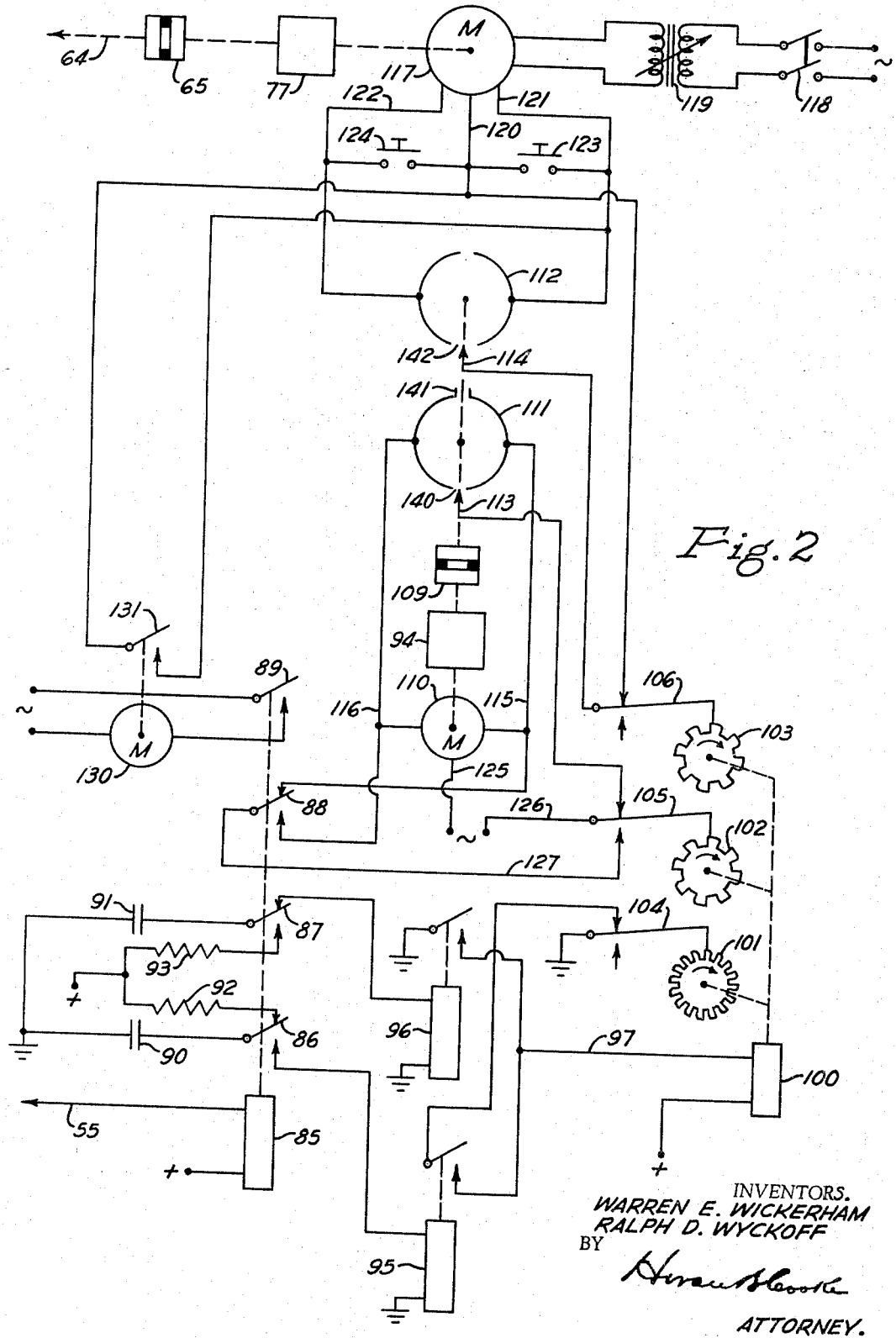

FIGURE 2 is a schematic wiring diagram of the control circuit employed in conjunction with FIGURE 1. In FIGURE 2 the lead 55 is a continuation of lead 55 of FIGURE 1, and the leads marked + in FIGURE 2 connect to the positive terminal 80 of the relay power supply 75. Lead 55 is connected to a relay coil 85 whose other terminal is connected to the relay power supply. Accordingly when excess potential appears across electrodes 29 and 30 and relay 52 becomes energized, the resultant closure of contacts 53 (FIGURE 1) will energize relay 85 of FIGURE 2. Relay 85 has a number of contacts 86, 87, 88, and 89 all of which are shown in the position when relay coil 85 is not energized. The arm of contacts 86 is connected to a condenser 90, and the arm of contacts 87 is connected to a condenser 91. The other terminals of the respective condensers 90 and 91 are connected together and to ground as indicated. The upper contact of contacts 86 is connected to a resistor 92 and the lower contact of contacts 87 is connected to a resistor 93. The other terminals of the respective resistors 92 and 93 are connected together and to the + terminal of the relay power supply as indicated. The lower contact of contacts 86 is connected to a relay coil 95. The upper contact of contacts 87 is connected to a relay coil 96. It is seen that when relay 85 is not energized condenser 90 is charged from the + lead through resistor 92 and the upper contact of contacts 86. When relay 85 is energized, the charged condenser 90 is connected to relay 95 which is thus momentarily energized during discharge of the condenser 90. Also when relay 85 is energized, condenser 91 is connected through the lower contact of contacts 87 and resistor 93 to the + lead and condenser 91 thus becomes charged. Upon release of relay 85 the condenser 91 discharges via the upper contact of contacts 87 through relay 96 which is thus momentarily energized during discharge of condenser 91. In this way the contacts of relay 95 are momentarily closed each time relay 52 of FIGURE 1 (and relay 85 of FIGURE 2) is energized. Correspondingly the contacts of relay 96 are momentarily closed each time relay 52 (and relay 85) releases. The resulting electrical impulses applied to lead 97 each serve to momentarily energize coil 100 of a cam-type stepping switch comprising elements 100 to 106 now to be described.

Element 100 is the coil of a cam-type stepping switch having three cams 101, 102, and 103 to be described in detail later. Each time the coil 100 is momentarily energized, the stepping system advances all of the cams 101, 102, and 103 by one unit. It is apparent from the circuit of FIGURE 2 thus far described that upon energization of relay 85 (through closure of contacts 53 of FIGURE 1) a momentary impulse will be delivered to coil 100 causing the cams to advance one unit, and also when the relay coil 85 is de-energized (by opening of contacts 53 of FIGURE 1) a momentary impulse is delivered to coil 100 to advance the cams one unit. Accordingly when excess voltage appears between electrodes 29 and 30 of FIGURE 1, the cams 101, 102, and 103 all advance one unit, and also when the excess voltage disappears, the cams again advance one unit.

The cam-type stepping switch, comprising elements 100, 101, 102, and 103, is arranged with three cams 101, 102, and 103, each of which has a switch lever 104, 105, and 106, respectively. The cam 101 is arranged so that arm 104 moves down when the cam advances one step from the position shown and moves up on the next step and so on continuously around the cam 101. The cams 102 and 103 are arranged so that the arms 105 and 106, respectively, will both move down when the respective cams advance one step from the position shown and then remain down when the cam advances a second step, then move up when the cam advances a third step and then remain up when the cam advances a fourth step, and so on continuously around the respective cams 102 and 103. It is thus seen that a complete sequence requires four steps. The cams 101, 102, and 103 are synchronized so that the arms 105 and 106 step down at the same time, and the arm 104 also steps down when arms 105 and 106 step down. The cams 101, 102, and 103 are further automatically properly sequenced with the opening and closing of relay contacts 53 of FIGURE 1 by the action of the circuit connected to the contacts of arm 104. In FIGURE 2 the cams and arms are shown in the proper operating position, namely, so that upon closure of contacts 53 the arms all step down. In the event that the stepping is out of sequence by one unit and arm 104 is already down (instead of up as it should be) then the momentary closure of the contacts of relay 95 will not energize coil 100 because of the open circuit at arm 104. However, when contacts 53 open, resulting in momentary closure of the contacts of relay 96, the coil 100 is energized as it should be and the system is again in step. In the event the system is out of sequence by two units no difficulty arises as will become evident, and in the event the system is out of sequence by three units the circuit including the contact at arm 104 will effect correction as above described.

A motor 110 conveniently energized from A-C power through leads 125 and 126 and through associated contacts, is mechanically connected to drive two commutators schematically indicated at 111 and 112. The motor 110 is a constant-speed reversible motor preferably of the synchronous A-C type and is provided with a conventional gear reduction 94 and slip clutch 109. The commutators 111 and 112 each have two equal segments having leads attached thereto as indicated. Commutator 111 has an insulating gap 140 that is sufficiently wide that motor 110 and the rotating system will not coast over the insulating gap when contact to a conducting segment is lost at the insulating gap in the event that the motor has been deriving its power through a conducting segment of the commutator as may occur under certain circumstances. Commutator 111 also has stops at 141 to limit rotation of the commutator in either direction to less than 180° from the insulating segment 140, so that when the commutator reaches the stop from either direction contact with the respective commutator segment is not broken but the clutch 109 simply slips. Commutator 112 has an insulating gap at 142 that is larger than gap 140 for a reason that will become evident later. Also when commutator 111 is stopped by the stop 141 the brush 114 of commutator 112 does not lose contact with the respective commutator segment that it has been riding. The commutator 111 has brush 113 and commutator 112 has brush 114 and the commutators are synchronized so that the respective brushes 113 and 114 are at the midpoint of the respective insulating segments 140 and 142 at the same time. This is called the "home" position. The motor 110 is of a reversible type whose windings have a common lead 125 and the motor 110 runs in one direction when power is applied to leads 115 and 125, and the motor 110 runs in the opposite direction when power is applied to leads 116 and 125. The brush 113 is connected to the upper contact of cam arm 105, and the brush 114 is connected to the arm 106 as indicated in FIGURE 2.

A reversible servomotor 117 is energized through a variable transformer 119 and manual on-off switch 118 from A-C power as indicated. The direction of rotation of the motor 117 is controlled by three leads 120, 121, and 122. With switch 118 closed and leads 120, 121, and 122 all open, the motor remains stopped. The motor 117 rotates in one direction when lead 120 is connected to lead 121. The motor 117 runs in the opposite direction when lead 120 is connected to lead 122. The circuit between lead 120 and either of leads 121 or 122 is completed through one of the commutator segments of commutator 112 and the upper contact of cam arm 106. Push button switches 123 and 124 are provided to permit selective manual operation of the servomotor 117 if such is found desirable, but the switches 123 and 124 are normally open and aer used only in initial adjustment of the system.

The motor 117 is mechanically connected to a gear box 77 and to one side of a slip clutch 65. The other side of the slip clutch 65 is connected to mechanical connection 64 previously mentioned which moves the slider 63 of potentiometer 62 (FIGURE 1). It is apparent that by closing a circuit between leads 120 and one of the leads 121 or 122 the motor 117 will move the slider 63 so that voltage tapped off from potentiometer 62 is increased, whereas by closing the circuit between leads 120 and the other of the leads 121 or 122 the motor 117 will run in a direction to reduce the voltage of potentiometer 62. Closure of the circuit between lead 120 and either lead 121 or 122 is provided by means of commutator 112, the lead 121 being connected to one segment of commutator 112 and the lead 122 being connected to the other segment of commutator 112. Closure of the respective circuit takes place through the brush 114 and the upper contact of cam arm 106 as indicated. It is apparent that unless commutator 112 is in its home position, the servomotor 117 will run in one direction or the other depending on the position of commutator 112 so long as contacts 106 are closed. If the commutator 112 is in its home position the brush 114 will be on the insulating segment 142 and motor 117 will not run.

Operation of the system of FIGURES 1 and 2 with pump motor 38 running will now be described. Certain preparatory procedures are necessary when starting the system. Alternating current power is turned on to activate motor 38, vibrators 31 and 32, magnetic stirrer 24, vacuum-tube voltmeter 56, D-C amplifier 42, relay power supply 75, recorder 60, and motor 110. Switch 118 is closed to energize servomotor 117. Push button 79 is momentarily pressed and voltmeter 56 observed to check the absence of cross talk previously mentioned. Switch 66 is then closed. Timer 130 is preferably not activated until a preliminary initial adjustment has been made. While the system will in time find its own equilibrium in automatic operation, it is convenient to initially bring the system into near equilibrium by the use of push-button switches 123 or 124. By observing operation of the commutators 111 and 112 the operator can tell whether the titrating current is much too high or too low and the operator can, by temporarily holding down the appropriate push button 123 or 124, bring the system to near equilibrium. After a rough initial adjustment, the system will function entirely automatically. Power is then applied to the circuit of timer 130 whose function will be described later.

Let it be assumed that the titration is close to an end point but that the voltage between electrodes 29 and 30 is sufficient to cause energization of relay coil 52. It is further assumed that cams 101, 102, and 103 are in such position that the arms 104, 105, and 106 are in the up position as shown in FIGURE 2 so that they will all drop down the next time coil 100 is energized. Inasmuch as contacts 53 are open, the relay coils 73 and 78 will not be energized. Contacts 68 will be open and no titrating current is supplied to the electrodes 26 and 27. Contacts 72 will be open and the recorder pen is inoperative. The incoming flow of sample from source 39 will gradually increase the mercaptan ions in cell 20 and the voltage between electrodes 29 and 30 will increase until relay 52 becomes energized. This will effect closure of contacts 53 thus energizing relay coils 73 and 78. Titrating current will begin to flow between electrodes 26 and 27 and the recorder pen will be activated to record this current. At the same time, closure of contacts 53 causes (through the operation of elements 85 to 97 of FIGURE 2 previously explained) an impulse to be delivered to coil 100 which thereby steps each of the cams 101, 102, and 103 one unit. This moves each of switch arms 104, 105, and 106 into the down position. Note that relay 85 remains energized, thus closing the lower contact of contacts 88. A circuit is thereby established from common lead 125 of motor 110 through lead 116, the lower contact of contacts 88, lead 127, the lower contacts of contacts 105 to lead 126. Power thus supplied to motor 110 through leads 125 and 116 drives the motor in one direction. During this interval the titrating current is turned on (by closure of contacts 68, FIGURE 1) and accordingly this direction will be defined the "on" direction. Commutators 111 and 112 will be rotated in the on direction by the motor 110 and the brushes 113 and 114 will contact one member of their respective commutators. Note that brush 113 connected to the upper member of contacts 105 is open, and that brush 114 connected to the cam arm 106 is also open. Accordingly, the motor 117 will not operate.

The silver ions generated by the titrating current will presently titrate the mercaptan ions present in the cell 20 whereupon the potential between electrodes 29 and 30 will fall and relay 52 will become de-energized. The resulting opening of contacts 53 de-energizes relay 78 and opens contacts 68 thereby turning off the titrating current. Also relay 73 will be de-energized to inactivate the recorder pen motor. Opening of contacts 53 also de-energizes relay coil 85 and this delivers an impulse in the manner previously explained to coil 100, which thereby advances each of the cams 101, 102, and 103 by one unit. Note that arms 105 and 106 remain in their down positions because cams 102 and 103 require two steps to change, but arm 104 moves to its up position. As coil 85 is de-energized, the relay contact 88 transfers to the upper contact, thus breaking the circuit of motor 110 through lead 116 and closing the motor circuit through lead 115 so that the motor 110 now runs in the opposite or "off" direction. Note that the titrating current to electrodes 26 and 27 is now not flowing. If the system is in equilibrium as assumed the commutator 111 will return exactly to the home position by the time mercaptan ions brought into the cell 20 by the sample stream again builds up the voltage between potential electrodes 29 and 30 to a value sufficiently high to again cause energization of relay 52.

In general, however, it will be apparent that motor 110 may run a certain length of time in the on direction and subsequently reverse and run a length of time in the off direction before the titrating current comes on again, and at this point in the sequence the commutator 111 may be in any one of three situations with respect to brush 113. If the length of time during which the current was on exceeded that during which it was off, the brush 113 will still contact the on commutator segment. This condition calls for an increase in the titrating current in order that the end point be reached more quickly and the on period be shortened. In the event that equilibrium exists, the brush 113 will return exactly to its home position. In the event that the duration of the off time exceeds the duration of the on time the brush 113 will contact the off commutator segment. This condition calls for a reduction in titrating current in order that the on time be lengthened.

At this point, i.e. the end of the off period, the sample flowing into cell 20 has brought in sufficient mercaptan ions to again raise the voltage between electrodes 29 and 30 beyond the end point and relay 52 again becomes energized. Relays 73, 78, and 85 are thereby energized. The titrating current is again turned on and the recorder pen motor is again activated. Energization of relay coil 85 again delivers an impulse to the coil 100 which thereby advances each of the cams 101, 102, and 103 one more unit. Cam arms 105 and 106 now step to their up positions but arm 104 will step to the down position. The circuit is now such that no A-C power is supplied to lead 127. The direction of rotation of the motor 110 is now conrtolled by whichever commutator segment is contacted by the brush 113. If in the previous on-off operations of motor 110, the on time exceeded the off time, then the brush 113 will be on the on commutator segment and the connectors are such as to cause continued rotation of motor 110 in the off direction. Inasmuch as commutator 112 is mechanically connected to commutator 111 a circuit is completed between the proper lead 121 or 122, brush 114, the upper contact 106, to lead 120 to run the motor 117 in such direction as to increase the titrating current. Conversely, if in the previous on-off operation of motor 110, the off time exceeded the on time then the brush 113 will be on the on commutator segment and motor 110 will reverse and run in the on direction. Also commutator 112 will complete a circuit from lead 120 to the other terminal of motor 117 and thereby rotate the motor 117 in the proper direction to reduce the titrating current. On the other hand if brush 113 is home, the brush 113 will be on the insulating segment 140 and motor 110 will not run at all. At the same time brush 114 will be in its home position and will be on the insulating segment 142 so that motor 117 also will not run and thus the equilibrium position is maintained. If out of equilibrium, the circuit of motor 110 is from lead 126, arm 105, brush 113, one of the commutator segments to lead 115 or 116, to the motor 110 and returning through lead 125 whereby motor 110 runs in a direction determined by whichever segment of commutator 111 is in contact with brush 113; and the control circuit of motor 117 is from lead 120, the upper contact of cam arm 106, brush 114, one of the commutator segments to lead 121 or 122, whereby motor 117 runs in a direction determined by whichever segment of commutator 112 is in contact with brush 114. The connections are such that in either event the motor 117 runs in a direction to change the titrating current so as to equalize the preceding on and off times, which as will become evident occur repeatedly thereafter. It is seen that if the immediately preceding on-off sequence of titrating current, the duration of the on time (with titrating current on) is longer than the duration of the off time (with titrating current off), the motor 110 will at the end of this on-off sequence find itself connected to one of the segments of commutator 111 appropriately wired to continue to run the motor toward the home position. Since the commutators 111 and 112 are mechanically coupled, the segment of commutator 112 now connected to brush 114 is such as to run motor 117 in a direction to reduce the titrating current. On the other hand if in the immediately preceding on-off sequence the duration of the off time (with titrating current off) is longer than the duration of the on time (with titrating current on) then motor 110 will at the end of this on-off sequence find itself connected to the other segment of commutator 111 and this is wired so as to reverse motor 110 as is now required in order to make it run toward the home position. Correspondingly the motor 117 will also be connected to the other segment of commutator 114 so as to run in a direction to raise the titrating current. Note that these adjustments take place while the titrating current is on, i.e. during the third step of the sequence while relay 52 is energized.

When the titrating current (now under automatic adjustment as explained above) causes the voltage between electrodes 29 and 30 to again fall below the end point so that relay coil 52 is again de-energized and contacts 53 open, the cams 101, 102, and 103 each advance a fourth step. The arms 105 and 106, however, remain in the up position and arm 104 moves to the up position. Relay 85 is de-energized and contact 88 is in its upper position, but this does not disturb the circuit of motor 110. Accordingly motor 110 (if not already at home) continues to run in the appropriate direction toward the home position as above explained, and motor 117 continues to appropriately correct the titrating current until motor 110 reaches the home position of commutators 111 and 112. When brush 113 reaches the home position, power to motor 110 is shut off because the brush 113 is then on the insulating segment 140, and power to motor 117 is also shut off because brush 114 is then on the insulating segment 142.

When the sample entering cell 20 again raises the potential between electrodes 29 and 30 sufficiently to cause energization of relay 52, the entire four-step sequence described above repeats, automatic adjustment of the titrating current always being made in such direction as to approach equality in the two periods of time that the titrating current is respectively on and off.

The actual titrating current (when on) must be such that the voltage between electrodes 26 and 27 is not so high as to decompose water in the electrolyte in cell 20, this being a well known precaution in coulometric titrations. The range of titrating current obtained from potentiometer 62 is adjusted by means of variable resistor 69, as well as the sample flow rate through cell 20. For titrating mercaptan concentration in the neighborhood of 50 p.p.m. a sample flow rate of about 1 cc./minute has been found satisfactory. In the case of the mercaptan titration herein described titrating currents in the range 1 to 5 ma. (when on during automatic operation) have been found satisfactory.

The normal cycling rate of the system will depend on the adjustment of resistor 69, the strength of the solution in cell 20, and the rate of pump 36 as compared to the volume of cell 20, as well as the particular titrating reaction being used. The character of the titration curve and the condition of the electrodes also affect the cycling rate to some degree. The gear ratio of gear box 94 is chosen to obtain a well-defined comparison of on and off times. The gear ratio of gear box 77 connected to the servomotor 117 is chosen to keep the change in titrating current sufficiently slow to prevent the system from hunting. Completion of a normal four-step sequence (i.e. one that does not involve operation of timer 130 to be described) should require between twenty seconds to several minutes or more. A typical normal four-step sequence preferably has a period of between twenty and sixty seconds.

The function and operation of elements 130 and 131 of FIGURE 2 may now be described. The motor 130 is a timer energized through relay contacts 89 from A-C power as indicated. The timer 130 is such that when energized by closure of contacts 89, the timer motor runs for a predetermined period of time at the end of which it automatically closes contacts 131. Whenever the A-C power is removed from the timer motor as by opening of contacts 89 when relay 85 is de-energized, the contacts 131 open and the timer automatically resets itself to zero. It is apparent from the circuit of FIGURE 2 that each time relay 85 is energized the timer 130 is started by closure of contacts 89 and if the end of the timed period is reached, the contacts 131 will close. This completes a circuit from lead 120 to lead 121 which runs motor 117 in such a direction as to increase the titrating current. It is seen that the circuit of contacts 131 is independent of the position of cam arm 106. The timed period is predetermined to be somewhat longer than that normally required for motor 110 to reach the stop 141 of commutator 111 so that in normal operation the switch 131 does not close. The timer 130 enters into the operation if the sample pumped into cell 20 should suddenly contain a very high concentration of mercaptan ions so as to call for a very large increase in titrating current. Without the timer circuit (elements 89, 130, and 131) the motor 110 would at the first step of the cycle have an abnormally long "on" time. During this first step of the cycle servomotor 117 does not run and the titrating current remains fixed. Consequently without the timer circuit the titration would in this situation never catch up to the high mercaptan concentration, and the system would fail to reach the second step of the cycle. However, in such event the timer 130 runs to the end of the timed period whereupon the timer switch 131 takes over control of motor 117 and directly runs the motor 117 to raise the titrating current, thus avoiding the failure that would otherwise result. On the other hand, if the sample pumped into cell 20 should suddenly contain a very low mercaptan concentration, the system quickly readjusts itself by simply running through an abnormally long off part of its sequence, the timer 130 being inoperative because the contacts 89 are open when the titrating current is off. In normal sequencing of motor 110 the timer 130 does not reach the end of its time period so that contacts 131 do not close and the timer circuit normally has no effect on the system at all.

It is apparent that the silver anode electrode 26 from which silver is electrolytically put into the solution in cell 20 must from time to time be renewed as it is consumed. For utmost reliability and precision of operation it is advisable to periodically clean all of the electrodes of foreign deposits that may form on the electrodes and interfere with their proper functioning. The cycling rate is found to be dependent on the cleanliness of the electrodes. We have found that agitating the electrodes 26 and 30 by means of vibrators 31 and 32 helps to keep the electrodes clean and increases the cycling rate. It has also been found that by placing a small amount of quartz sand in the titration cell so that the sand is kept swirling past the electrodes by the action of stirring bar 23, there results a scouring action on the electrodes that is further effective in keeping the electrodes clean and preventing sluggish operation of the system.

By way of example only, and not by way of limitation, various components that are employed in this invention may be specified as follows:

| Element: | Specification |
| --- | --- |
| 24 | Magnetic stirrer. |
| 29 | Calomel electrode, miniature size. |
| 31 and 32 | Buzzer, 12 v., 100 ma., coil, spring-adjusted to buzz at 120 c.p.s., electrodes attached to clapper. |
| 33 and 34 | 1,000 ohm, 2 watt, linear potentiometers. |
| 35 | Step-down transformer, 100 v.–25 v., 1 amp., 60 c.p.s. |
| 36 and 37 | Miniature gear pump. |
| 38 | A.C. motor (one motor operates both pumps 36 and 37). |
| 42 | Relay amplifier. |
| 45 | 4.7 megohms. |
| 46 | 10 ohms variable. |
| 47 | 10,000 ohms. |
| 48 | Battery, mercury type, 1.34 v. |
| 49 | 10,000 ohms. |
| 52 | Relay (integral with amplifier, item 42). |
| 56 | VTVM. |
| 61 | Battery 22.5 v. "B" battery. |
| 62 | 2,000 ohm, 10 turn, linear potentiometer. |
| 65 | Slip clutch, friction type. |
| 67 | 0–5 ma. ammeter. |
| 69 | 4,000 ohms variable. |
| 70 | 1.455 ohms to accommodate 8 mv. recorder. |
| 71 | Potentiometer recorder, 8 mv. full scale. |
| 73 | Slow-operate relay, 28 v., D-C, S.P.S.T. contact. |
| 74 | 82 ohms. |
| 75 | 28 v., D-C power supply. |
| 77 | Gear box, integral with motor 117, output speed 4 r.p.m. |
| 78 | Slow-release relay, 28 v., D-C, S.P.S.T. contact. |
| 85 | Relay, 28 v., D-C, 4-p., D.T. contact. |
| 90 and 91 | Electrolytic capacitor, 50 mfd, 50 v. |
| 92 and 93 | 10,000 ohms. |
| 94 | Gear box, integral with motor, item 110. |
| 95 and 96 | Relay, 28 v., D-C, S.P.S.T. contact. |
| 100 | Stepping relay, 3 cam, 32 steps per revolution. |
| 109 | Slip clutch, friction type. |
| 110 | Synchronous motor, 2 r.p.m., 4 watt at output of gear box 94. |
| 117 | Shaded-pole motor, 4 r.p.m., 14 watt. |
| 119 | Variable voltage transformer. |
| 130 | Time delay timer, adjustable delay 0 to 14.5 seconds. |

This invention provides a method and apparatus for controlling a dynamic system by varying a system parameter whose time integral effects a measured quantity. The control is such that deviations of the measured quantity above and below a selected value serve to turn the system parameter appropriately on and off. The time duration of two successive on and off periods are compared, and the system parameter is varied in response to said comparison. In the particular example herein disclosed the system is represented by the continuous flow of a liquid having a particular ion that is titrated in the titration cell, the parameter under control is the titrating electric current that flows between the current electrodes, and the measured quantity is the potential between the potential electrodes. The type of on-off time comparison employed in the particular example is the difference in the length of these time intervals, and the system parameter (current) is adjusted so as to make the on time equal the off time so that the difference between these time intervals is a minimum. It is apparent that in the titrator herein described the quantity recorded on the recorder 71 is the current flowing between the current electrodes 26 and 27 and this current is a measure of the ion concentration being determined.

It is apparent that this invention is applicable to the continuous coulometric titration of the flowing stream which may for example be a sample stream by-passed from a larger process stream for purposes of analysis, monitoring of ion concentration, and/or control of ion concentration in the larger process stream.

What we claim as our invention is:
1. A method of controlling the titrating current in the coulometric titration of a continuously flowing liquid which comprises
  measuring a titration potential in the liquid,
  turning the titrating current on whenever said potential varies on one side of a predetermined potential,
  turning the titrating current off whenever said potential varies on the other side of a predetermined potential,
  measuring the length of a time interval during which the titrating current is on,
  measuring the length of an adjacent time interval during which the titrating current is off, and
  adjusting the magnitude of the titrating current so that the time during which the current is on bears a predetermined relation to the time during which the current is off.

2. A method of controlling the titrating current in the coulomertic titration of a continuously flowing liquid which comprises
  measuring a titration potential in the liquid,
  turning the titrating current on whenever said potential varies on one side of a predetermined potential, turning the titrating current off whenever said potential varies on the other side of a predetermined potential, measuring the length of a time interval during which the titrating current is on, measuring the length of an adjacent time interval during which the titrating current is off, and adjusting the magnitude of the titrating current so that the time interval during which the current is on becomes equal to the time interval during which the current is off.

3. A method of controlling the titrating current in the coulometric titration of a continuously flowing liquid which comprises measuring a titration potential in the liquid, turning the titrating current on whenever said potential varies on one side of a predetermined potential, turning the titrating current off whenever said potential varies on the other side of a predetermieed potential, measuring the difference between the length of a time interval during which the current is on and the length of an adjacent time interval during which the current is off, and adjusting the magnitude of the titrating current so that said time difference is a minimum.

4. An automatic coulometric titrating apparatus which comprises a titration cell, means introducing the liquid to be titrated into said cell at a constant rate, a pair of current electrodes in said cell, a pair of potential electrodes in said cell, current-supply means supplying controllable current to said current electrodes, means connected to said current electrodes indicating the current flowing therebetween, means connected to said potential electrodes responsive to the potential therebetween, means connected to said potential-responsive means and to said current-supply means adapted to turn on said current-supply means whenever the potential between said potential electrodes varies on one side of a predetermined value and to turn off said current-supply means whenever the potential between said potential electrodes varies on the other side of a predetermined value, means comparing the duration of successive time intervals during which said current-supply means is turned on and during which said current-supply means is turned off, and means connected to said time-comparing means and to said current-supply means controlling said current in response to the comparison of said times.

5. An automatic coulometric titrating apparatus which comprises a titration cell, means introducing the liquid to be titrated into said cell at a constant rate, a pair of current electrodes in said cell, a pair of potential electrodes in said cell, current-supply means supplying controllable current to said current electrodes, means connected to said current electrodes indicating the current flowing therebetween, means connected to said potential electrodes responsive to the potential therebetween, means connected to said potential-responsive means and to said current-supply means adapted to turn on said current-supply means whenever the potential between said potential electrodes varies on one side of a predetermined value and to turn off said current-supply means whenever the potential between said potential electrodes varies on the other side of a predetermined value, means comparing the duration of successive time intervals during which said current-supply means is turned on and during which said current-supply means is turned off, and means connected to said time-comparing means and to said current-supply means controlling said current in a manner to equalize said time durations.

6. An automatic coulometric titrating apparatus which comprises a titration cell, means introducing the liquid to be titrated into said cell at a constant rate, a pair of current electrodes in said cell, a pair of potential electrodes in said cell, current-supply means supplying controllable current to said current electrodes, means connected to said current electrodes indicating the current flowing therebetween, means connected to said potentail electrodes responsive to the potential therebetween, means connected to said potential-responsive means and to said current-supply means adapted to turn on said current-supply means whenever the potential between said potential electrodes varies on one side of a predetermined value and to turn off said current-supply means whenever the potential between said potential electrodes varies on the other side of a predetermined value, means measuring the difference between the duration of successive time intervals during which said current-supply means is turned on and during which said current-supply means is turned off, and means connected to said time-difference measuring means and to said current-supply means controlling said current in a manner to minimize said time difference.

7. Apparatus for continuous automatic coulometric titration of a flowing stream which comprises a titration cell, means introducing the liquid to be titrated into said cell at a constant rate, a pair of current electrodes in said cell, a pair of potential electrodes in said cell, adjustable current-supply means supplying current to said current electrodes, a servomotor connected to said current-supply means adjusting the current supplied to said current electrodes, means connected to said current electrodes indicating the current flowing therebetween, means connected to said potential electrodes responsive to the potential therebetween, means connected to said potential-responsive means and to said current-supply means adapted to turn on said current-supply means whenever the potential between said potential electrodes varies on one side of a predetermined value and to turn off said current-supply means whenever the potential between said potential electrodes varies on the other side of a predetermined value, a constant-speed reversible electric motor, relay means connected to said electric motor and to said current-supply means adapted to effect rotation of said electric motor in one direction whenever said current supply means is turned on and to effect rotation of said electric motor in the opposite direction whenever said current-supply means is turned off, and means connected to said electric motor and to said servomotor effecting rotation of said servomotor in a direction to increase the current to said current electrodes whenever said electric motor runs farther in the on direction than in the off direction during successive periods in which said current is respectively on and off and effecting rotation of said servomotor in a direction to decrease the current to said current electrodes whenever said electric motor runs farther in the off direction than in the on direction during said successive periods.

8. Apparatus for continuous automatic coulometric titration of a flowing stream which comprises
   a titration cell,
   means introducing the liquid to be titrated into said cell at a constant rate,
   a pair of current electrodes in said cell,
   a pair of potential electrodes in said cell,
   adjustable current-supply means supplying current to said current electrodes,
   a servomotor connected to said current-supply means adjusting the current supplied to said current electrodes,
   means connected to said current electrodes indicating the current flowing therebetween,
   means connected to said potential electrodes responsive to the potential therebetween,
   a constant-speed reversible electric motor,
   a first commutator mechanically connected to said electric motor and having a home position,
   a second commutator mechanically connected to said electric motor rotating synchronously with said first commutator and having a home position,
   means connected to said potential-responsive means and to said current-supply means adapted to turn on said current-supply means whenever the potential between said potential electrodes varies on one side of a predetermined value and to turn off said current-supply means whenever the potential between said potential electrodes varies on the other side of a predetermined value,
   relay means connected to said electric motor and to said current-supply means adapted to effect rotation of said electric motor in one direction whenever said current-supply means is turned on and to effect rotation of said electric motor in the opposite direction whenever said current-supply means is turned off,
   circuit means connected to said electric motor and to said first commutator adapted to return said electric motor to a home position subsequent to successive periods during which the current-supply means is on and off,
   circuit means connected to said servomotor and to said second commutator adapted to effect rotation of said servomotor in a direction to increase the current to said current electrodes whenever said second commutator is on one side of its home position and to effect rotation of said servomotor in a direction to decrease the current to said current electrodes whenever said second commutator is on the other side of its home position.

9. Apparatus for continuous automatic coulometric titration of a flowing stream containing mercaptan sulfur ions which comprises
   a titration cell,
   means introducing a liquid stream containing mercaptan sulfur ions to be titrated into said cell at a constant rate,
   a silver anode in said cell,
   a platinum cathode in said cell,
   a current-supply circuit supplying controllable current between said anode and said cathode,
   means connected to said current-supply circuit indicating the current flowing between said anode and said cathode,
   a standard reference potential electrode in said cell,
   a second silver electrode in said cell,
   means connected to said reference electrode and to said second silver electrode responsive to the potential therebetween,
   means connected to said potential-responsive means and to said current-supply circuit adapted to turn on said current between said anode and said cathode whenever the response of said potential-responsive means varies on one side of a predetermined value and to turn off said current between said anode and said cathode whenever the response of said potential-responsive means varies on the other side of a predetermined value,
   means comparing the duration of successive time intervals during which said current between said anode and said cathode is turned on and during which said current between said anode and said cathode is turned off, and
   means connected to said time-comparing means and to said current-supply circuit controlling said current between said anode and said cathode in response to the comparison of said time.

10. Apparatus for continuous automatic coulometric titration of a flowing stream containing mercaptan sulfur ions which comprises
    a titration cell,
    means introducing a liquid stream containing mercaptan sulfur ions to be titrated into said cell at a constant rate,
    a silver anode in said cell,
    a platinum cathode in said cell,
    a current-supply circuit supplying controllable current between said silver anode and said platinum cathode,
    a servomotor connected to said current-supply circuit adjusting the current supplied between said anode and said cathode,
    means connected to said current-supply circuit indicating the current flowing between said anode and said cathode,
    a standard reference potential electrode in said cell,
    a second silver electrode in said cell,
    means connected to said reference electrode and to said second silver electrode responsive to the potential therebetween,
    means connected to said potential responsive means and to said current-supply circuit adapted to turn on said current between said anode and said cathode whenever the response of said potential-responsive means varies on one side of a predetermined value and to turn off said current between said anode and said cathode whenever the response of said potential-responsive means varies on the other side of a predetermined value,
    a constant-speed reversible electric motor,
    relay means connected to said electric motor and to said current-supply circuit adapted to effect rotation of said electric motor in one direction whenever said current between said anode and said cathode is turned on and to effect rotation of said electric motor in the opposite direction whenever said current between said anode and said cathode is turned off, and
    means connected to said electric motor and to said servomotor effecting rotation of said servomotor in a direction to increase the current between said anode and said cathode whenever said electric motor runs farther in the on direction than in the off direction during successive periods in which said current is respectively on and off and effecting rotation of said servomotor in a direction to decrease the current between said anode and said cathode whenever said electric motor runs farther in the off direction than in the on direction during said successive periods.

11. The apparatus of claim 4 wherein said potential electrodes are located on a common equipotential surface in the electric current field between said current electrodes.

12. The apparatus of claim 4 including vibration-producing means connected to at least one of said electrodes adapted to mechanically agitate said electrode.

13. The apparatus of claim 4 including sand in said titration cell, and stirring means in said titration cell adapted to stir the contents of said cell whereby said sand scours said electrodes to prevent accumulation of deposits thereon.

References Cited

UNITED STATES PATENTS

| | | | |
|---|---|---|---|
| 2,928,775 | 3/1960 | Leisey | 204—195 |
| 3,032,493 | 5/1962 | Coulson et al. | 204—195 |
| 3,162,585 | 12/1964 | De Ford et al. | 204—195 |

OTHER REFERENCES

Levine: "Instruments and Automation," May 1957, p. 883.

JOHN H. MACK, *Primary Examiner*.

T. TUNG, *Assistant Examiner*.